(12) United States Patent
Bergs et al.

(10) Patent No.: US 11,243,526 B2
(45) Date of Patent: Feb. 8, 2022

(54) ASSEMBLY AND METHOD FOR PREDICTING THE REMAINING SERVICE LIFE OF A MACHINE

(71) Applicant: Siemens Aktiengesellschaft, Munich (DE)

(72) Inventors: Christoph Bergs, Herzogenrath (DE); Marcel Hildebrandt, Munich (DE); Mohamed Khalil, Munich (DE); Serghei Mogoreanu, Munich (DE); Swathi Shyam Sunder, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/267,932

(22) PCT Filed: Aug. 12, 2019

(86) PCT No.: PCT/EP2019/071567
§ 371 (c)(1),
(2) Date: Feb. 11, 2021

(87) PCT Pub. No.: WO2020/035439
PCT Pub. Date: Feb. 20, 2020

(65) Prior Publication Data
US 2021/0247757 A1     Aug. 12, 2021

(30) Foreign Application Priority Data
Aug. 14, 2018   (EP) .................................. 18188924

(51) Int. Cl.
*G05B 23/02* (2006.01)
*G06N 3/04* (2006.01)
(Continued)

(52) U.S. Cl.
CPC ....... *G05B 23/0283* (2013.01); *G06N 3/0427* (2013.01); *G06N 3/08* (2013.01); *G06N 5/04* (2013.01)

(58) Field of Classification Search
CPC .............. G05B 23/0283; G05B 19/406; G05B 19/0425; G06N 5/04; G06N 3/08; G06N 3/0427; G06N 3/02; G06F 30/20
See application file for complete search history.

(56) References Cited

U.S. PATENT DOCUMENTS

| | | | |
|---|---|---|---|
| 8,725,456 B1* | 5/2014 | Saha .................. | G05B 23/0283 702/181 |
| 2012/0179326 A1* | 7/2012 | Ghelam ............. | G06F 11/3013 701/31.9 |

(Continued)

OTHER PUBLICATIONS

International Search Report and Written Opinion in corresponding PCT Patent Application No. PCT/EP2019/071567 dated Dec. 2, 2019. 13 pages.

*Primary Examiner* — Stephanie E Bloss
(74) *Attorney, Agent, or Firm* — Schmeiser, Olsen & Watts, LLP

(57) ABSTRACT

A plurality of basic simulations independent of one another are carried out, which determine respective remaining service life predictions for the machine. The remaining service life predictions and characteristic data are fed to a neural network, which outputs weights for the remaining service life predictions. A final prediction is calculated from the remaining service life predictions by weighting the remaining service life predictions relative to one another. A hybrid model is produced, which results from the combination of the basic simulations with the neural network. The remaining service life can be predicted not only for a small number of machines for which a specific simulation model has been manually created. The hybrid model enables condition (Continued)

Figure 1:
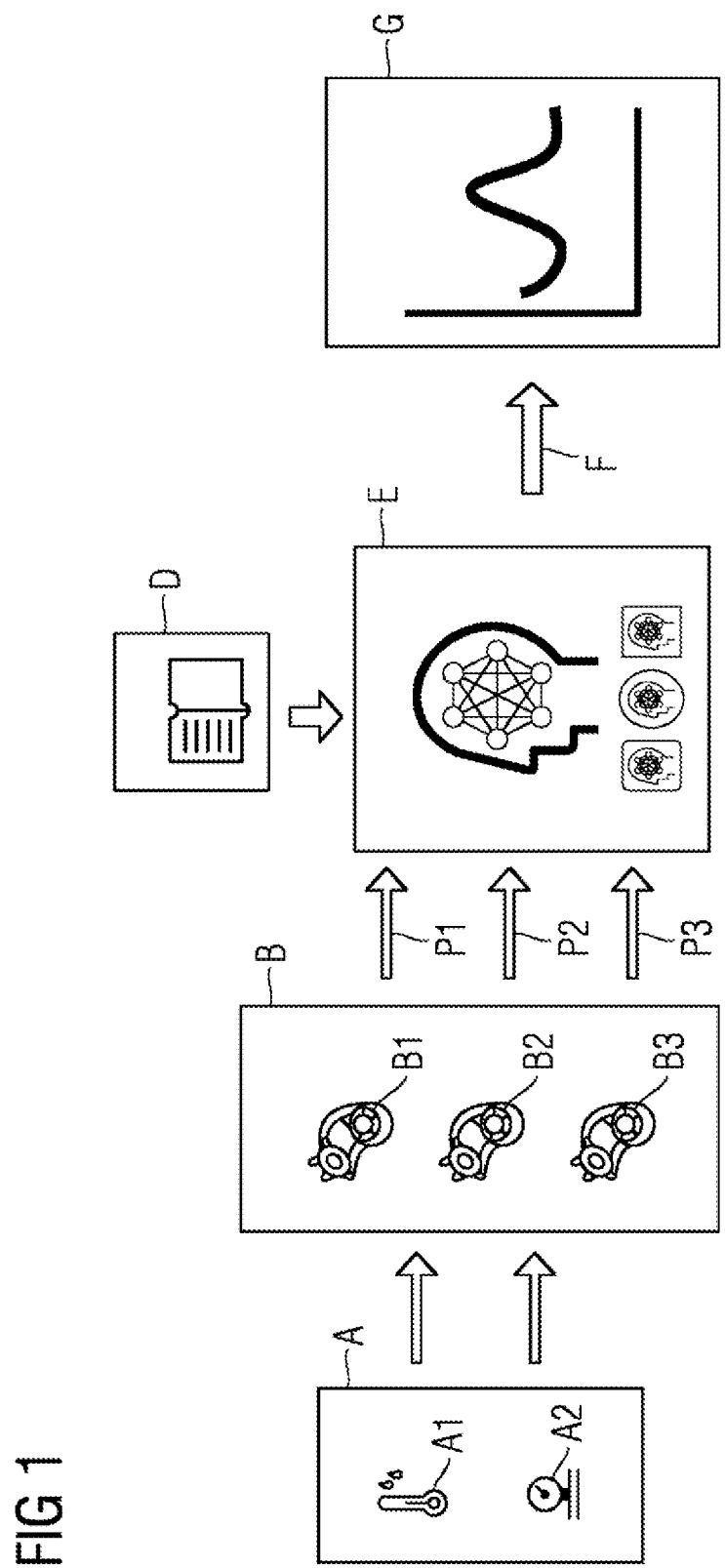

monitoring for any further types and configurations of machines that merely belong to the same machine class. The basic simulations can therefore also be applied to previously unknown machines.

9 Claims, 2 Drawing Sheets

(51) Int. Cl.
*G06N 3/08* (2006.01)
*G06N 5/04* (2006.01)

(56) References Cited

U.S. PATENT DOCUMENTS

| | | | | |
|---|---|---|---|---|
| 2013/0275059 | A1* | 10/2013 | Bernhard | G01L 1/00 |
| | | | | 702/42 |
| 2015/0324686 | A1* | 11/2015 | Julian | G06N 3/08 |
| | | | | 706/25 |
| 2017/0091358 | A1* | 3/2017 | Zhang | G06F 30/17 |
| 2018/0143257 | A1* | 5/2018 | Garcia | G01R 31/382 |

* cited by examiner

_(1)_

ASSEMBLY AND METHOD FOR PREDICTING THE REMAINING SERVICE LIFE OF A MACHINE

CROSS-REFERENCE TO RELATED APPLICATIONS

This application is a national stage entry of PCT Application No. PCT/EP2019/071567 having a filing date of Aug. 12, 2019, which claims priority to European Patent Application No. 18188924.7, having a filing date of Aug. 14, 2018, the entire contents of which are hereby incorporated by reference.

FIELD OF TECHNOLOGY

In order to predict a remaining service life (also referred to as "remaining useful life") of a machine used in industry, approaches from the fields of condition monitoring in general, and in particular from what is known as structural health monitoring, are known. Monitoring the mechanical loading of the machine makes it possible to predict its provisional remaining service life, thereby making it possible to minimize its repair times and downtimes. The service life of the machine is increased and servicing intervals are able to be scheduled better.

BACKGROUND

In order to predict the remaining service life, an expert in the respective domain normally creates a CAD model and a structural mechanics model through the finite element method (FEM simulation) on the machine. Condition data of the machine are then ascertained, these being obtained for example from sensor data that may be supplied inter alia by vibration sensors on the machine. The condition data are taken into consideration in the FEM simulation as boundary conditions, thereby making it possible to predict the remaining service life.

The embodiment of the present invention is intended to provide an alternative to the prior art.

SUMMARY

To predict a remaining service life of a machine, in particular of a motor, a plurality of mutually independent basic simulations are performed on the basis of condition data of the machine, each of these ascertaining a remaining service life prediction for the machine in a computer-aided manner. The remaining service life predictions and characteristic data that describe properties of the machine are supplied to a neural network. The neural network outputs weightings for the remaining service life predictions. A final prediction is calculated from the remaining service life predictions in a computer-aided manner by weighting the remaining service life predictions with respect to one another according to the weightings.

The arrangement contains one or more computing units that are programmed to perform a plurality of mutually independent basic simulations that each ascertain a remaining service life prediction for the machine on the basis of condition data of the machine; to supply the remaining service life predictions, together with characteristic data that describe properties of the machine, to a neural network; to output weightings for the remaining service life predictions by way of the neural network; and to calculate a final prediction from the remaining service life predictions, wherein the remaining service life predictions are weighted with respect to one another according to the weightings.

The advantages mentioned below do not necessarily have to be achieved through the subjects of the independent patent claims. On the contrary, these may also be advantages that are achieved just through individual embodiments, variants or developments. The same applies to the following explanations.

The computing unit of the arrangement is for example a programmable logic controller, a microprocessor or microcontroller, a system-on-chip or a programmable digital component, for instance a "field-programmable gate array" (FPGA), a workstation, a server, a computer network or a cloud. A plurality of said computing units may also execute the same or different calculating steps in parallel.

The method and the arrangement use a hybrid model that results from combining the basic simulations with the neural network. Unlike in previous approaches, the remaining service life is able to be predicted not only for a small number of machines for which a specific simulation model has been created manually. Instead of this, the hybrid model also allows condition monitoring for any further types and configurations of machines that belong merely to the same machine class. The basic simulations may thus also be applied to hitherto unknown machines. The time outlay for manually creating a FEM simulation and possibly a CAD model is dispensed with. The neural network makes a data-driven decision as to which of the basic simulations should be applied to what extent as machine experts.

Unlike in the case of manually looking up the best basic simulation on the basis of the characteristic data, the neural network may also evaluate and implicitly learn aspects of the characteristic data that are not immediately apparent to humans. The neural network may furthermore also learn complex nonlinear relationships between the characteristic data, the condition data and the remaining service life. The learning may take place in a data-driven manner, such that the assignment does not have to be specified manually.

A further advantage is that the neural network is able to combine a plurality of basic simulations and weight them with respect to one another. This results in an aggregated model that has a greater prediction capability than any basic simulation on its own.

In contrast to purely data-driven learning with a neural network that does not interact with the basic simulations, this results in the advantage that the weightings that the neural network outputs are accessible to humans, such that it is possible to understand which of the basic simulations were applied to what extent to predict the remaining service life. This also results in the option for a maintenance engineer or calculation engineer to monitor the weightings and possibly to correct them.

According to one embodiment, the neural network outputs a vector of linear weightings. The final prediction is calculated by linearly combining the remaining service life predictions using the weightings as coefficients.

According to a further embodiment, sensors acquire sensor data of operation of the machine. The condition data of the machine are derived from the sensor data in a computer-aided manner.

In one development, the sensor data, after they have been acquired, are transmitted to a cloud in which the rest of the method steps are performed. As an alternative, the condition data, after they have been derived, are transmitted to a cloud in which the rest of the method steps are performed.

According to one embodiment, the condition data of the machine are derived from the sensor data by a condition identification module, in particular a neural network. This is a neural network different from the one mentioned above.

The computer-readable data carrier stores a computer program that executes the method when it is run on a processor.

The computer program is run on a processor and in the process executes the method.

BRIEF DESCRIPTION

Figure 2:
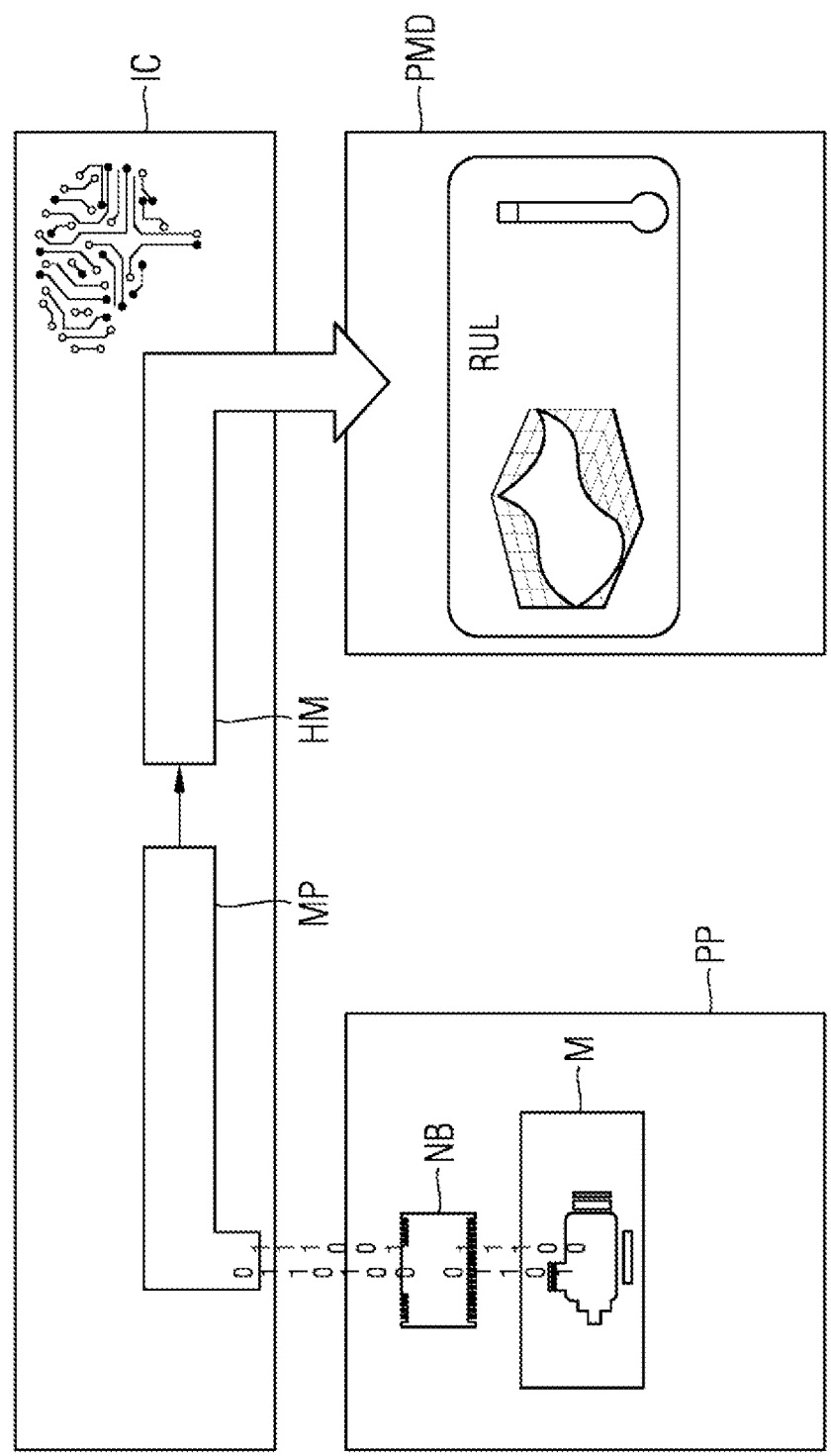

Some of the embodiments will be described in detail, with reference to the following figures, wherein like designations denote like members, wherein:

FIG. 1 depicts a flowchart for predicting a remaining service life of a machine; and FIG. 2 depicts an overview of a production installation PP, of an industrial cloud IC and of a predictive maintenance dashboard PMD.

DETAILED DESCRIPTION

FIG. 1 shows a flowchart for predicting a remaining service life of a machine. Sensors first of all acquire sensor data of operation of the machine. In many cases, sensor measurements of vibrations are particularly important. The machine is for example a motor in a production installation. The sensor data are collected in a decentralized manner in a peripheral unit and forwarded to a programmable logic controller.

In order to monitor a motor, for example two to three sensors, for instance vibration and acceleration sensors, are installed and may possibly also be supplemented with a temperature sensor and strain gauges. The sensors are arranged at the drive side on the end shield, as close as possible to the bearing or the shaft. The measurement direction of the vibration sensors is oriented laterally to the shaft.

A condition identification module, not shown in any more detail in FIG. 1, derives condition data A from the sensor data, including for example a parallel offset as first condition data A1 and an angular offset of a shaft orientation of the motor as second condition data A2. The condition identification module is an AI-based identification module that is able to derive, from the sensor data, as condition data A, faults or anomalies, such as for instance the parallel offset or angular offset, or even general operating parameters such as for instance a rotational speed of the motor. The condition data may for example contain type, extent and/or location of such faults or anomalies and depend on the respective machine class.

A neural network, for example a convolutional neural network (CNN), a recurrent neural network (RNN) or a long short-term memory (LSTM) network, is suitable as condition identification module.

This neural network is trained beforehand in order to learn the relationship between the sensor data and the condition data. This training takes place beforehand since it is able to be performed in a robust and generic manner for machines of the same class.

To this end, sensor data are recorded beforehand from an experimental structure of a plurality of machines or from machines in real use that have been equipped with the abovementioned sensors. The sensor data are provided manually with condition data of the respective machines (for example healthy or defective, possibly which faults) in the form of a label, thereby forming training data. The neural network is then trained with these training data.

In the exemplary embodiment shown in FIG. 1, a condition identification module trained in this way is already present, meaning that this is able to provide the condition data A directly from the sensor data of the machine to be investigated.

A plurality of mutually independent basic simulations B are then performed in a computer-aided manner on the basis of the condition data A. The basic simulations B are simulation models that correspond at least to the machine class of the machine and predict a remaining service life. Certain characteristics are predefined by the machine class. For instance, all of the basic simulations relate for example to the machine class motor or a particular motor class, for instance electric motor, or a subclass, such as the three-phase current motor. For the machine that is specifically present, the basic simulations B do not have to be able to make any accurate predictions, since they each simulate different types of machines within the respective class. Nevertheless, any basic simulation may contain information that contributes to predicting the remaining service life of a previously unknown machine. The extent to which a given basic simulation is able to contribute to the prediction results from the underlying physical properties of the machine and of the basic simulation. In this case, a particular role is played by the geometry and the material properties of the machine, which are specified in a data sheet of the machine that is present as part of its characteristic data D. The characteristic data D are for example catalog data that specify properties of the machine, for instance its geometry or its material properties.

A first basic simulation B1 in this case ascertains a first remaining service life prediction P1 for the machine, a second basic simulation B2 ascertains a second remaining service life prediction P2, and a third basic simulation B3 ascertains a third remaining service life prediction P3. The remaining service life predictions P1, P2 and P3 and the characteristic data D that describe the properties of the machine are then supplied to a neural network E that outputs weightings F. The neural network E shown in FIG. 1 is independent of the neural network that has been explained above as a possible implementation of the condition identification module and which derives condition data from the sensor data.

A final prediction G is calculated from the remaining service life predictions in a computer-aided manner by weighting the remaining service life predictions P1, P2 and P3 with respect to one another according to the weightings F.

The neural network E is for example a multilayer forward network and outputs a vector of linear weightings (w1, w2, w3). In this case, the final prediction G may be calculated by linearly combining the remaining service life predictions P1, P2 and P3 using the weightings w1, w2, w3 as coefficients:

$$G = w1 \cdot P1 + w2 \cdot P2 + w3 \cdot P3.$$

The remaining service life predictions P1, P2 and P3 and the final prediction G may be for example numerical values that specify a remaining duration in days or months. A floating point number that is stored in a double word may be selected in each case as data type for these variables, for example.

In principle any black box or white box models are suitable as basic simulations B. By way of example, models that model relationships between components of the machine (for example rotor, stator, bearing etc.) and their interaction through empirical equations are also suitable for the basic simulations B.

FEM simulations are used as basic simulations. The abbreviation FEM stands for the finite element method, known from the prior art, which is used to model and simulate the machine. In the context of the finite element method, the condition data A are taken into consideration directly as boundary conditions. FEM simulations are particularly suitable for machines having complicated structures, as is the case with motors.

Prior to using it to predict the remaining service life, the neural network E has to undergo training, in which the neural network E implicitly learns an assignment of any machine to the individual basic simulations B, that is to say which basic simulations B are particularly well suited to this machine.

For this purpose, training data are generated by performing the basic simulations for a large amount of different condition data. The condition data are generated artificially by first selecting a region in the space of the condition data that covers the most realistic possible bandwidth of condition data, that is to say conditions such as faults and anomalies that may actually occur during ongoing operation. Values along an equidistant grid are then generated in this region. The condition data in this case contain numerous virtual anomalies that are processed by the basic simulations or the finite element models. A remaining service life is calculated for each configuration of condition data, resulting in each case in a data pair as training data for the neural network E. The data pair contains the respective condition data as input data and the respective remaining service life as output data. These data pairs are used to train the neural network E.

FIG. 2 shows a production installation PP in which a machine M, for example a motor, is operated. A remaining service life RUL of the machine M is intended to be ascertained and output to a maintenance engineer. The particularity is that there is no specific simulation model for the machine M, that is to say that it is still unknown in this sense.

The machine M is equipped with sensors. These are the same type of sensors using which the condition identification module described above was trained to derive condition data from the sensor data. Suitable locations for installing the sensors, which allow sensor measurements of sufficient quality on the machine M, are selected for example by a person skilled in the art or in accordance with a standard. Since the machine M stems from the same machine class whose machines were used to train the condition identification module, structure, performance and dimensions are similar to the extent that the condition identification module is also able to derive the condition data for the machine M from the sensor data.

The condition identification module is implemented for example as an edge computing algorithm that runs in an embedded industrial PC NB, which receives the sensor data from the machine M and forwards the condition data to an industrial cloud IC. As an alternative, the sensor data may also just be buffer-stored in the embedded industrial PC NB. In this case, the condition identification module operates in the industrial cloud IC and derives the condition data as soon as the sensor data are received in the industrial cloud IC.

The industrial cloud IC holds a machine profile MP for the machine M, which machine profile contains the abovementioned characteristic data of the machine M and information about the location of the machine M and the embedded industrial PC NB. The machine profile MP serves as an instance of the machine M in the industrial cloud IC that supplies a hybrid model HM with information about the machine M. The hybrid model HM contains the basic simulations B and the neural network E from FIG. 1. In addition to the condition data, it also receives the characteristic data of the machine M from the machine profile MP and calculates, as explained with reference to FIG. 1, a remaining service life RUL of the machine M, which is output to a maintenance engineer on a predictive maintenance dashboard PMD. After the machine profile MP has been set up and the hybrid model HM has been trained, this process is able to run in a fully automated manner.

A SIMATIC Nanobox is suitable for example as embedded industrial PC NB; an IoT gateway, for instance a SIMATIC IOT2040, may also be used as an alternative. MindSphere is suitable for example as industrial cloud IC.

The described algorithms and computing steps may be executed for example in computing units of the machine, in local programmable logic controllers, on servers or in a cloud.

The specific design of the algorithms and simulations depends on the sensors and the technology of the machines. Numerous condition identification algorithms and simulation algorithms are known from the prior art for different sensor technologies and types of machine and may be used to perform the individual calculating steps.

Although the embodiment of the present invention has been described and illustrated in detail by the exemplary embodiments, it is not restricted by the disclosed examples. Other variations may be derived therefrom by a person skilled in the art without departing from the scope of protection of the present invention. The described exemplary embodiments, variants, embodiments and developments may also be combined freely with one another.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for predicting a remaining service life of a machine, the method comprising:
   training, by one or more computer processors, a neural network to learn the relationship between sensor data and condition data for a class of machine;
   defining, by the one or more computer processors, for the class of machine, characteristic data that describe properties of the class of machine;
   performing, by the one or more computer processors, a plurality of mutually independent simulations on a basis of condition data of the machine;
   ascertaining, by the one or more computer processors, a remaining service life prediction for the machine for each of the plurality of mutually independent simulations;
   supplying, by the one or more computer processors, the ascertained remaining service life predictions for the machine and characteristic data that describe properties of the machine to the neural networks;
   weighting, by the neural network, the ascertained remaining service life predictions for the machine;
   outputting, by the neural network, weightings for the remaining service life predictions found in the weighting step;

calculating, by the one or more computer processors, a final prediction from the remaining service life predictions by weighting the remaining service life predictions with respect to one another according to the weightings; and providing, by the one or more computer processors, the final prediction to an interface operable by a maintenance engineer.

2. The method as claimed in claim 1, wherein:

the neural network outputs a vector of linear weightings; and the final prediction is calculated by linearly combining the remaining service life predictions using the weightings as coefficients.

3. The method as claimed in claim 1, wherein:

sensors acquire sensor data of operation of the machine; and the condition data of the machine are derived from the sensor data in a computer-aided manner.

4. The method as claimed in claim 3:

wherein the sensor data, after the sensor data is acquired, are transmitted to a cloud in which the rest of the method steps are performed; or wherein the condition data, after the condition data is derived, are transmitted to a cloud in which the rest of the method steps are performed.

5. The method as claimed in claim 3:

wherein the condition data of the machine are derived from the sensor data by a condition identification module.

6. An arrangement for predicting a remaining service life of a machine comprising one or more computing units programmed to:

train a neural network to learn the relationship between sensor data and condition data for a class of machine;

define for the class of machine, characteristic data that describe properties of the class of machine;

perform a plurality of mutually independent basic simulations that each ascertain a remaining service life prediction for the machine on the basis of condition data of the machine;

ascertain a remaining service life prediction for the machine for each of the plurality of mutually independent simulations;

supply the ascertained remaining service life predictions, together with characteristic data for the machine that describe properties of the machine, to the neural network;

weighting, by the neural network, the ascertained remaining service life predictions for the machine;

output weightings for the remaining service life predictions by way of the neural network;

calculate a final prediction from the remaining service life predictions, wherein the remaining service life predictions are weighted with respect to one another according to the weightings; and provide the final prediction to an interface operable by a maintenance engineer.

7. The arrangement as claimed in claim 6, wherein:

sensors are designed to acquire sensor data of operation of the machine; and a neural network is designed to derive the condition data of the machine from the sensor data.

8. A computer-readable data carrier:

storing a computer program that executes the method as claimed in claim 1 when run on a processor.

9. A computer program:

which is run on a processor and in the process executes the method as claimed in claim 1.

* * * * *